US012521824B2

(12) United States Patent
Matsui et al.

(10) Patent No.: US 12,521,824 B2
(45) Date of Patent: Jan. 13, 2026

(54) CAVITATION SURFACE PROCESSING NOZZLE AND CAVITATION SURFACE PROCESSING APPARATUS

(71) Applicant: SUGINO MACHINE LIMITED, Namerikawa (JP)

(72) Inventors: Taiki Matsui, Namerikawa (JP); Masashi Tsunemoto, Namerikawa (JP); Daniel Gordon Sanders, Itasca, IL (US)

(73) Assignee: SUGINO MACHINE LIMITED, Namerikawa (JP)

(*) Notice: Subject to any disclaimer, the term of this patent is extended or adjusted under 35 U.S.C. 154(b) by 0 days.

(21) Appl. No.: 19/175,551

(22) Filed: Apr. 10, 2025

(65) Prior Publication Data

US 2025/0345887 A1   Nov. 13, 2025

(30) Foreign Application Priority Data

May 7, 2024   (JP) .................... 2024-075282

(51) Int. Cl.
*B05B 1/02* (2006.01)
*B23P 9/04* (2006.01)

(52) U.S. Cl.
CPC . *B23P 9/04* (2013.01); *B05B 1/02* (2013.01)

(58) Field of Classification Search
CPC ..... B23P 9/04; B24C 5/04; B05B 1/00; B05B 1/042
See application file for complete search history.

(56) References Cited

U.S. PATENT DOCUMENTS

| 3,488,006 A * | 1/1970 | Gigantino ............... B05B 1/042 239/602 |
| 5,897,062 A | 4/1999 | Enomoto et al. |
| 2012/0238188 A1 | 9/2012 | Miller |

(Continued)

FOREIGN PATENT DOCUMENTS

| JP | S60-168554 A | 9/1985 |
| JP | 03234415 A * | 10/1991 |

(Continued)

OTHER PUBLICATIONS

JP08267400 Englishtranslation (Year: 1996).*

(Continued)

*Primary Examiner* — Jason L Vaughan
*Assistant Examiner* — Amanda Kreiling
(74) *Attorney, Agent, or Firm* — United IP Counselors, LLC

(57) ABSTRACT

A cavitation surface processing nozzle includes: a nozzle tip including a first plane from which liquid is ejected and perpendicular to an ejection axis; a second plane perpendicular to the ejection axis and another side plane of the first plane; and a nozzle hole including a discharge groove located on the first plane and having a semi-cylindrical shape extending in a first direction perpendicular to the ejection axis, an ejection hole extending along the ejection axis to be connected to the discharge groove and having a right elliptic cylindrical shape having an elliptic cross section with a long diameter extending in the first direction, and an introduction portion having a right conical surface centered on the ejection axis and connected to the ejection hole.

17 Claims, 7 Drawing Sheets

(56) References Cited

U.S. PATENT DOCUMENTS

2021/0387309 A1* 12/2021 Sanders ................ B24C 1/10
2024/0001509 A1    1/2024 De Silva et al.
2024/0001549 A1    1/2024 Niemueller et al.

FOREIGN PATENT DOCUMENTS

| JP | H05-084452 A | | 4/1993 | |
|----|----|----|----|----|
| JP | H06-234063 A | | 8/1994 | |
| JP | H07-241494 A | | 9/1995 | |
| JP | 08267400 A | * | 10/1996 | |
| JP | H08-267400 A | | 10/1996 | |
| JP | 2002539924 A | * | 11/2002 | ............... B24C 5/04 |
| JP | 2009-254951 A | | 11/2009 | |
| WO | WO-2007052027 A1 | * | 5/2007 | ............. B24C 1/045 |
| WO | 2009/154567 A1 | | 12/2009 | |

OTHER PUBLICATIONS

JP03234415 English translation (Year: 1991).*
Japanese Office Action mailed on Nov. 26, 2024 in a corresponding Japanese Patent Application No. 2024-075282(10 pages).
Extended European Search Report mailed on Sep. 16, 2025, in corresponding European Patent Application No. 25172616.2 (8 pages).

* cited by examiner

CAVITATION SURFACE PROCESSING NOZZLE AND CAVITATION SURFACE PROCESSING APPARATUS

CROSS-REFERENCE TO RELATED APPLICATIONS

This application claims the benefit of priority to Japanese Patent Application No. 2024-075282, filed on May 7, 2024, the entire contents of which are hereby incorporated by reference.

BACKGROUND

1. Technical Field

The present invention relates to a cavitation surface processing nozzle and a cavitation surface processing apparatus.

2. Description of the Background

A conventional nozzle includes a plate, a hollow body, and a cap assembled to the hollow body to hold the plate in the hollow body (US 2024/0001549 A1, hereinafter, referred to as Patent Literature 1).

BRIEF SUMMARY

According to Patent Literature 1, there is a case where a high compressive stress is not applied or a case where the surface grinding amount is small.

An object of the present invention is to provide a cavitation surface processing nozzle and a cavitation surface processing apparatus capable of imparting a strong compressive stress to a workpiece surface and promoting grinding of the workpiece surface.

A first aspect of the present invention provides a cavitation surface processing nozzle, including:
  a nozzle tip including
    a first plane from which liquid is ejected, the first plane perpendicular to an ejection axis;
    a second plane perpendicular to the ejection axis, the second plane being another side plane of the first plane; and
  a nozzle hole including
    a discharge groove located on the first plane, the discharge groove having a semi-cylindrical shape extending in a first direction perpendicular to the ejection axis,
    an ejection hole extending along the ejection axis to be connected to the discharge groove, the ejection hole having a right elliptic cylindrical shape having an elliptic cross section with a long diameter extending in the first direction, and
    an introduction portion having a right conical surface centered on the ejection axis, the introduction portion connected to the ejection hole.

A second aspect of the present invention provides a cavitation surface processing apparatus, including:
  a processing tank storing processing liquid;
  a table disposed in the processing tank, the table on which a workpiece is installed;
  the cavitation surface processing nozzle; and
  a nozzle pipe to which the cavitation surface processing nozzle is attachable, the nozzle pipe movable in a front-rear direction, a vertical direction, and a lateral direction with respect to the table.

The nozzle tip is, for example, a jewel, an artificial jewel, or a sintered body mainly composed of an artificial jewel. The nozzle tip is made of industrial grade polycrystalline or monocrystalline materials such as sintered diamond, or additively manufactured mixtures of natural or synthetic or crystalline materials having a Mohs hardness of 8 or greater. The nozzle tip is, for example, a corundum, diamond, or an artificial diamond sintered body.

The two planes are substantially the same means that other plane is included between an area within 0.5 mm from one plane.

The nozzle tip and the support may be integrally formed. For example, the nozzle tip and the support may be formed from the same material.

The corrosion resistant alloy is, for example, stainless steel, nickel steel, or nickel aluminide.

The ejection angle is preferably 5 to 15 degrees. More preferably, the ejection angle is between 7 degrees and 10 degrees.

The processing liquid stored in the processing tank comprises, for example, a rust inhibitor and water.

An abrasive may be suspended in the processing liquid stored in the processing tank.

According to the present invention, a strong compressive stress can be applied to the surface of the workpiece, and grinding of the surface of the workpiece is promoted.

DETAILED DESCRIPTION

Figure 1:
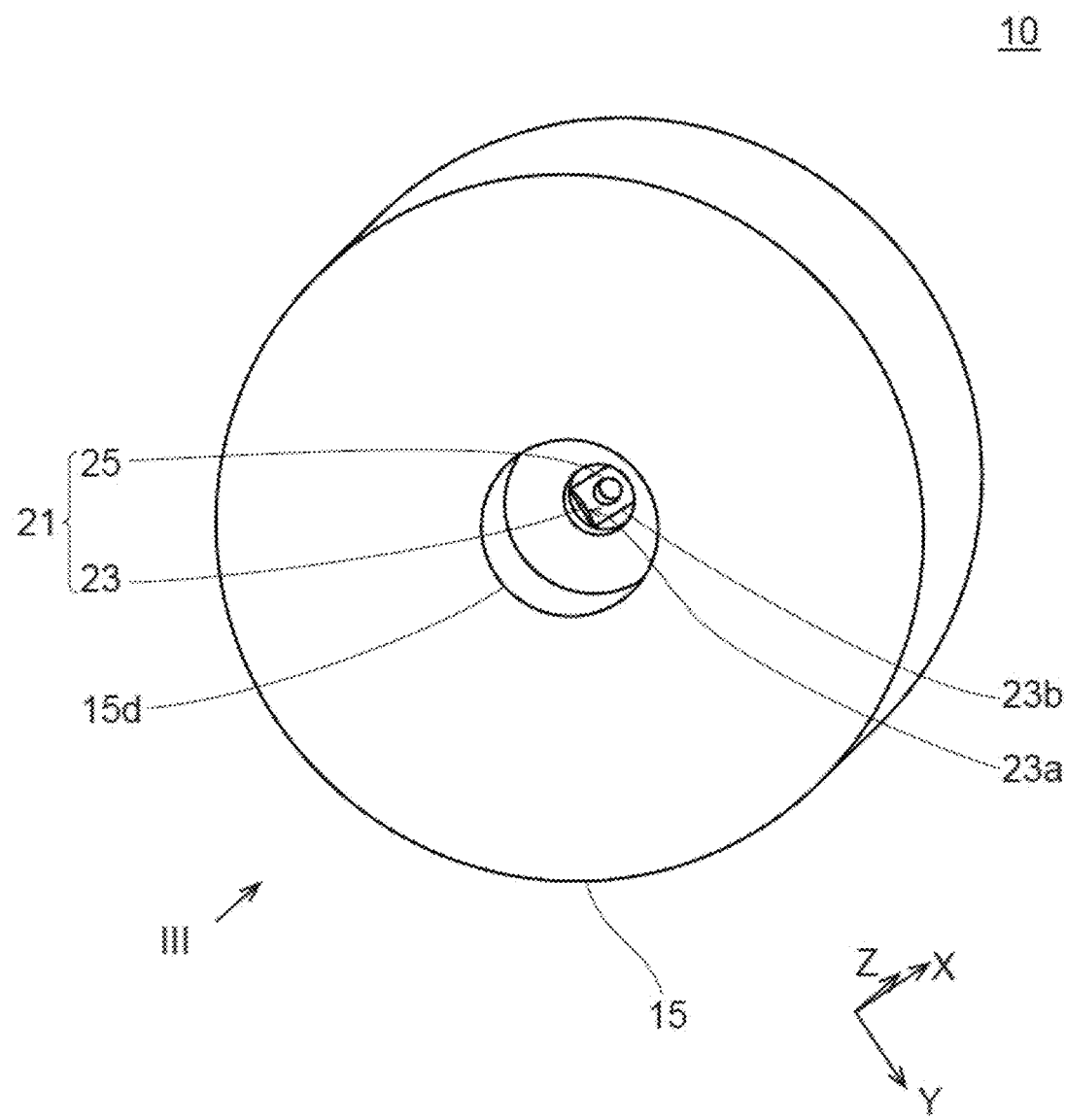
FIG. 1 is a perspective view of a cavitation surface processing nozzle according to a present embodiment.
Figure 2:
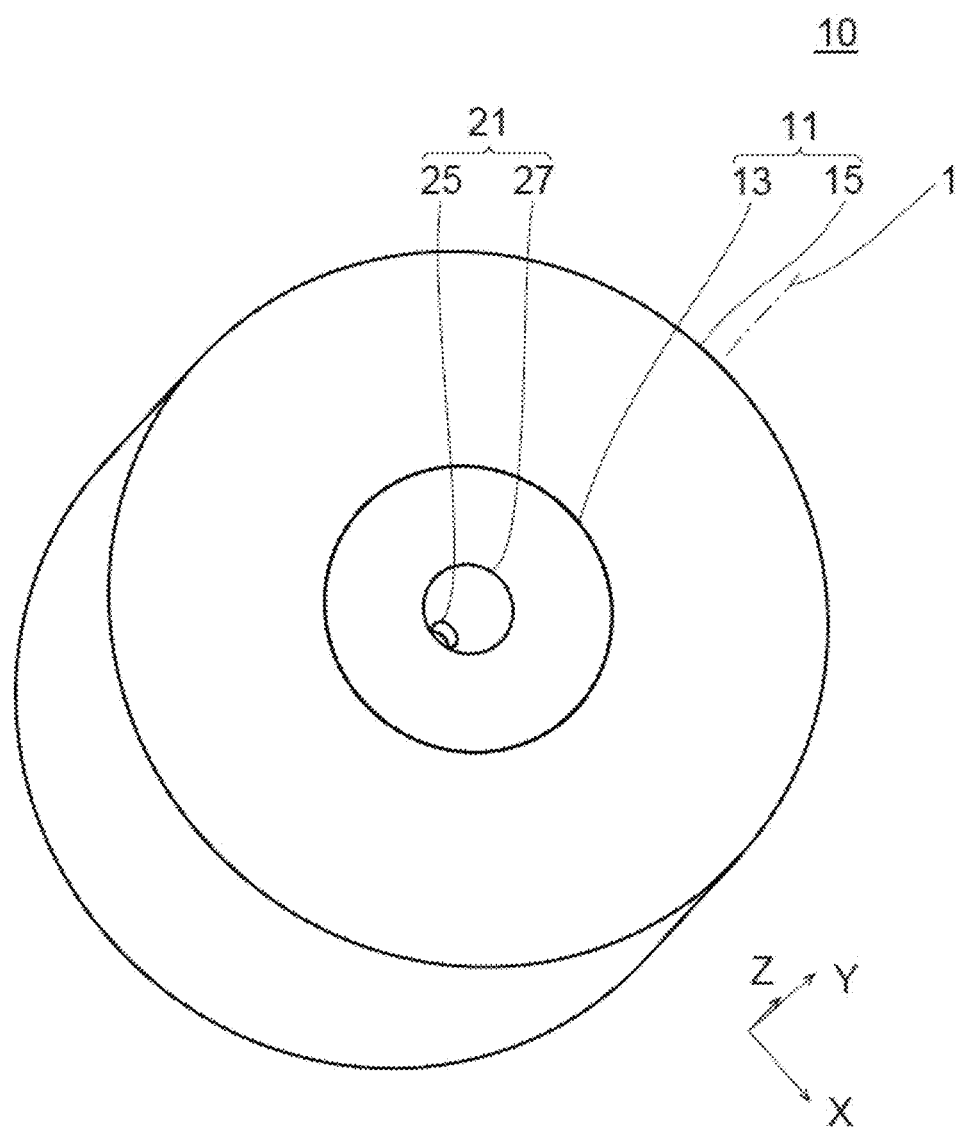
FIG. 2 is a perspective view of the cavitation surface processing nozzle according to the present embodiment.

As shown in FIGS. 1 to 5, a nozzle (cavitation surface processing nozzle) 10 according to a present embodiment includes a nozzle body 11. The nozzle body 11 includes a nozzle tip 13 and a support 15. The nozzle 10 has an ejection axis 1. For convenience, a first direction is defined as an X direction, a direction in which the ejection axis 1 extends is defined as a Z direction, and a direction perpendicular to the X direction and The Z direction is defined as a Y direction.

The nozzle tip 13 is a right cylinder centered on the ejection axis 1. The nozzle tip 13 is a diamond sintered body. The nozzle tip 13 has a first plane 13a, a second plane 13b, a cylindrical surface 13c, and a nozzle hole 21. The first plane 13a and the second plane 13b are perpendicular to the ejection axis 1.

The nozzle hole 21 is arranged centered on the ejection axis 1. The nozzle hole 21 has a discharge groove 23, an ejection hole 25, and an introduction portion 27.

The discharge groove 23 has a lateral surface 23a and an opening 23b. The discharge groove 23 is located on the first plane 13a. The discharge groove 23 extends along the X direction. A cross section of the discharge groove 23 parallel to YZ plane has a semicircular shape. The lateral surface 23a is a plane. The lateral surfaces 23a are both end surfaces of the discharge groove 23 and extend parallel to YZ plane. The opening 23b is an opening on the first plane 13a of the discharge groove 23. The opening 23b is rectangular.

Figure 3:
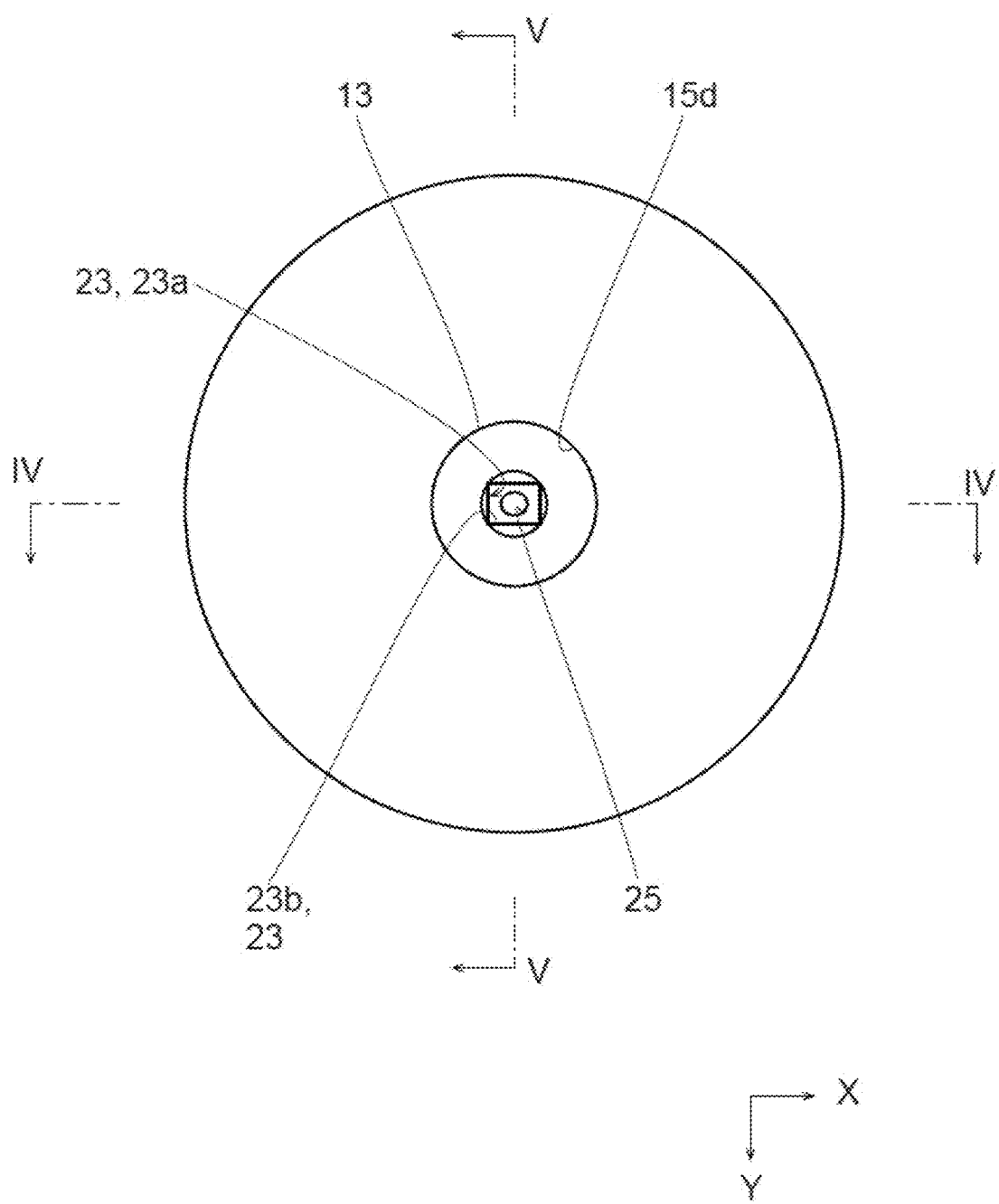
FIG. 3 shows an arrow III view in FIG. 1.
Figure 4:
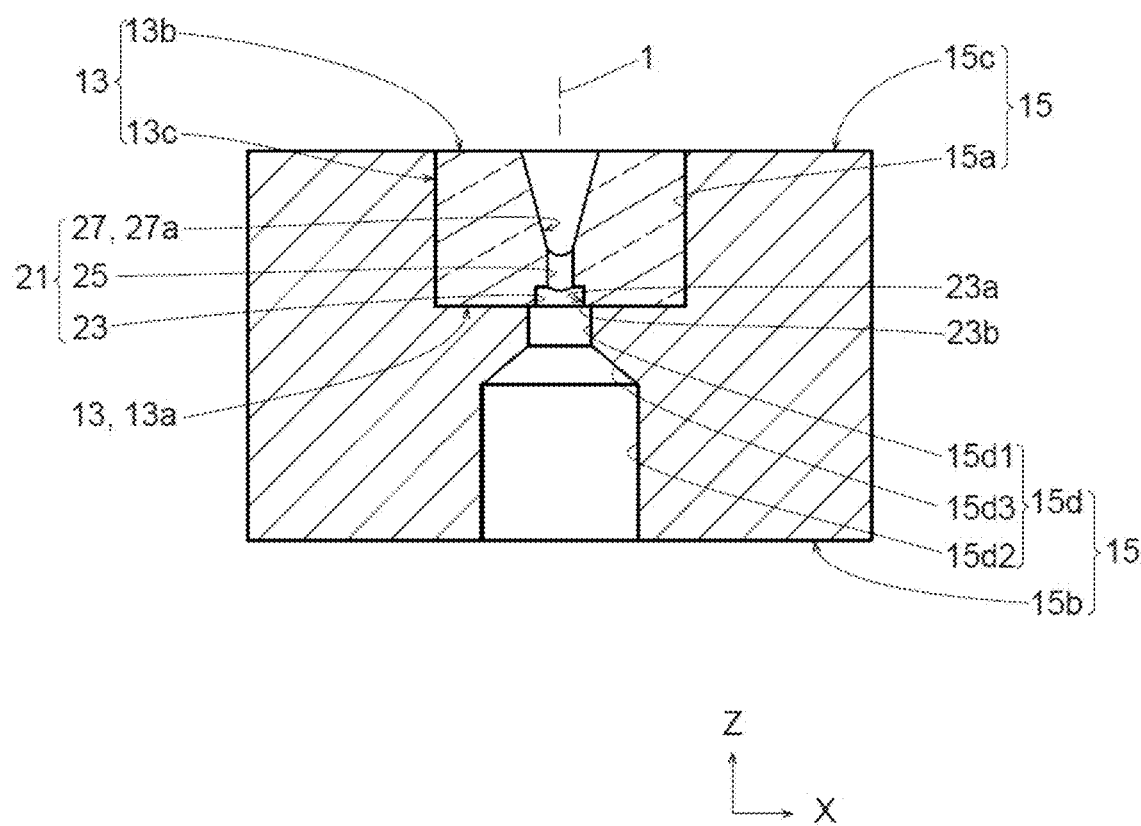
FIG. 4 is a cross-sectional view taken along line IV-IV in FIG. 3.
Figure 5:
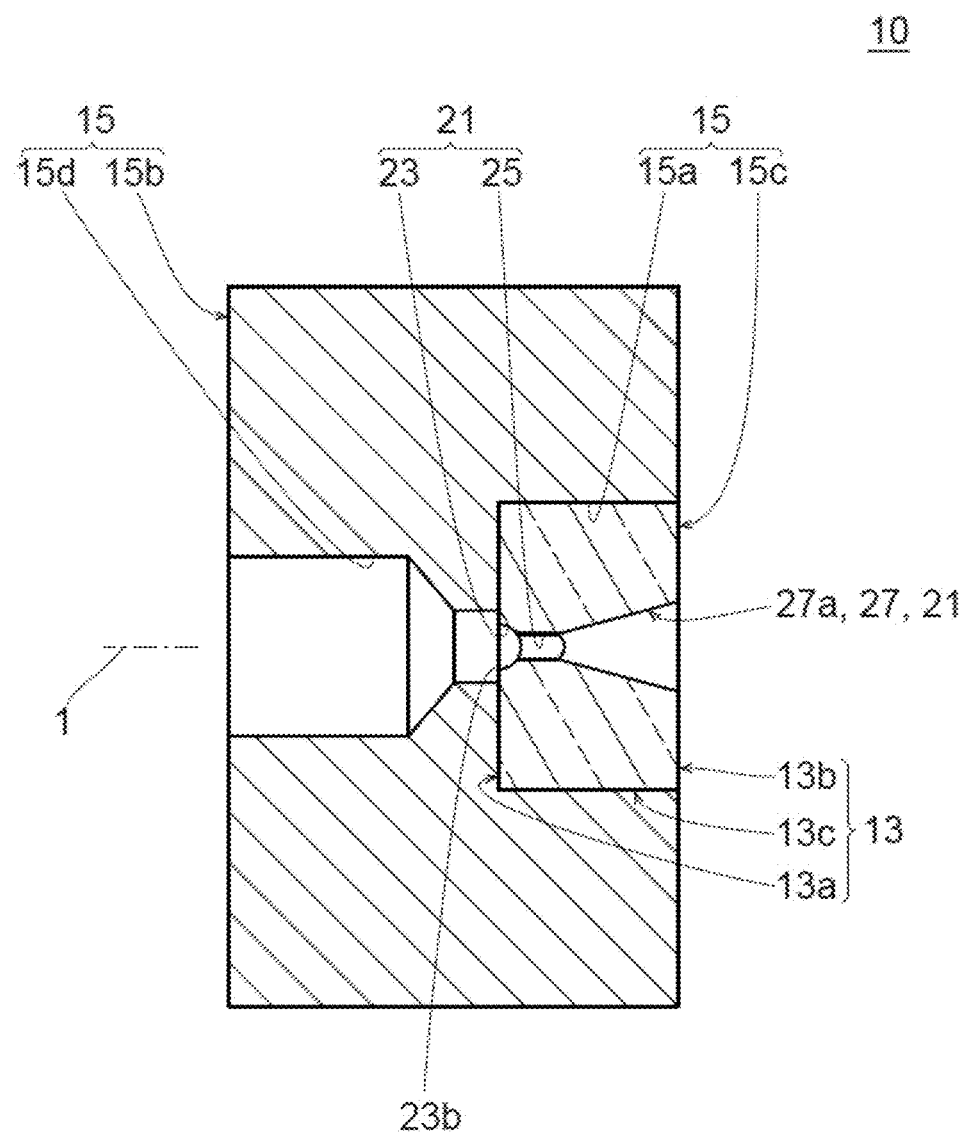
FIG. 5 is a cross-sectional view taken along line V-V in FIG. 3.

The ejection hole 25 extends along the ejection axis 1. The ejection hole 25 has a rectangular elliptic columnar shape. As shown in FIG. 3, the cross section of the ejection hole 25 in XY plane is elliptic. The center of the cross section is located on the ejection axis 1. The major axis of the cross section extends in the X direction.

The introduction portion 27 has a right conical shape. The introduction portion 27 is a rotating body centered on the ejection axis 1. The introduction portion 27 has a right conical surface 27a. The right conical surface 27a has a smaller diameter toward the first plane 13a. The right conical surface 27a is directly connected to the elliptic cylindrical surface of the ejection hole 25.

The support 15 includes a nozzle tip chamber 15a, a second bottom surface 15b, a first bottom surface 15c, and a jet passage hole 15d. The support 15 has a right cylindrical shape centered on the ejection axis 1. The support 15 is, for example, stainless steel. The first bottom surface 15c is substantially flush with the second plane 13b of the nozzle tip 13. The distance between the first bottom surface 15c and the second plane 13b is, for example, 0.5 mm or less.

The nozzle tip chamber 15a, which is a right cylinder centered on the ejection axis 1, extends from the first bottom surface 15c. The nozzle tip 13 abuts the nozzle tip chamber 15a on both surfaces of the first plane 13a and the cylindrical surface 13c. The nozzle tip 13 is fixed to the nozzle tip chamber 15a. The jet passage hole 15d has a right-cylindrical shape centered on the ejection axis 1. The jet passage hole 15d may be a stepped hole. The jet passage hole 15d has a small-diameter portion 15d1, a large-diameter portion 15d2, and an enlarged portion 15d3. The small-diameter portion 15d1 has a smaller diameter than the large-diameter portion 15d2. The enlarged portion 15d3 smoothly connects the small-diameter portion 15d1 and the large-diameter portion 15d2. The enlarged portion 15d3 is, for example, a right truncated cone. The cross-sectional shape of the enlarged portion 15d3 may be a gently enlarged trumpet shape or a bell shape. As shown in FIG. 3, the cross section of the small-diameter portion 15d1 is larger than the opening 23b. In other words, the entire edge of the opening 23b is located within the cross-section of the small-diameter portion 15d1. The jet passage hole 15d is connected to the nozzle tip chamber 15a. The jet passage hole 15d may be a right elliptic cylindrical shape, a right conical shape, a trumpet shape, or a bell shape. The jet passage hole having a conical shape expands in cross-section as it moves away from the nozzle tip 13.

Figure 6:
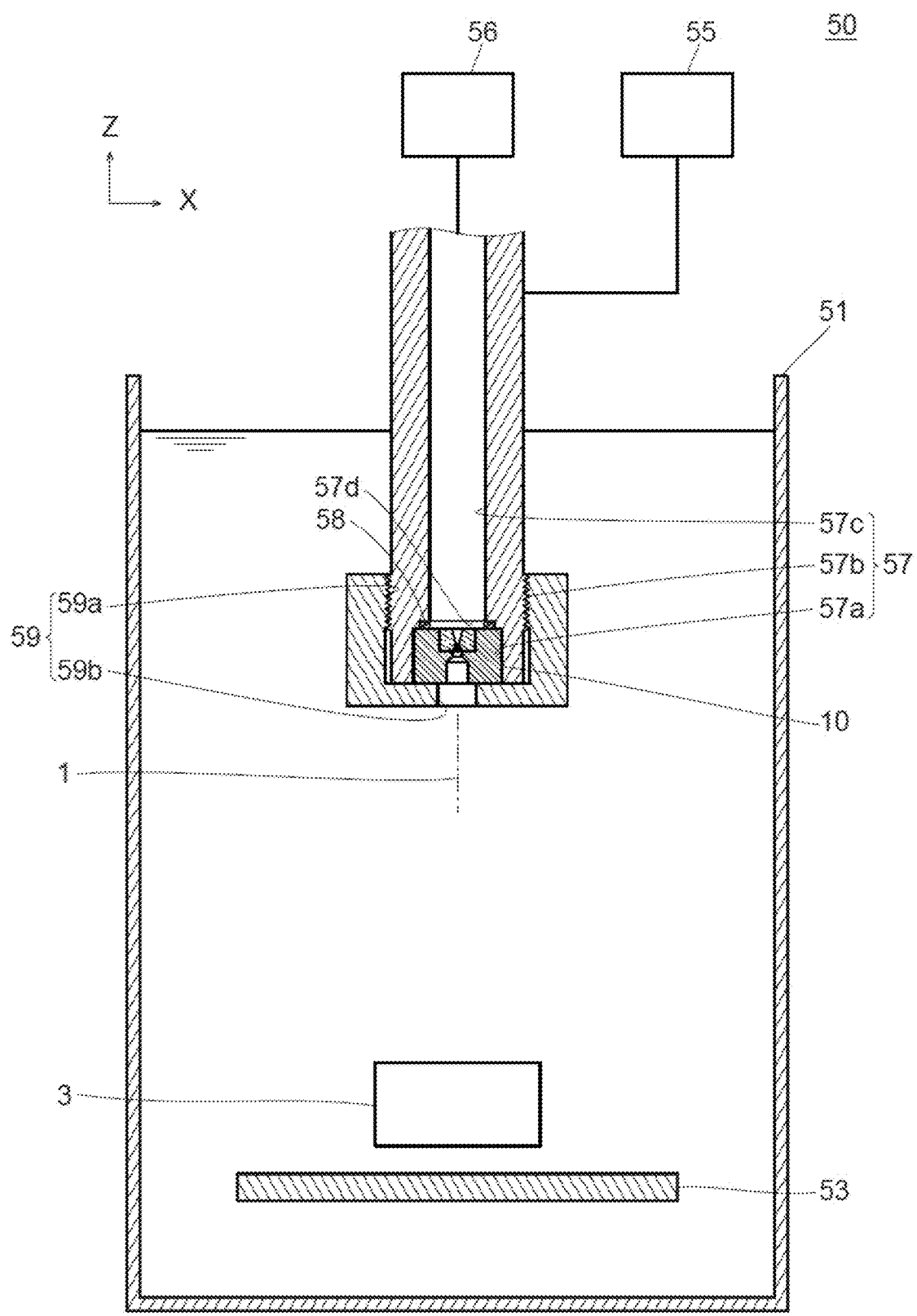
FIG. 6 shows a cavitation surface processing apparatus according to a present embodiment.

As shown in FIG. 6, the cavitation surface processing apparatus 50 includes a processing tank 51, a nozzle pipe 57, a packing 58, a cap 59, a nozzle 10, a table 53, a high-pressure pump 56, and a moving device 55.

The processing tank 51 stores a processing liquid. The table 53 is disposed in the processing tank 51. The workpiece 3 is installed on the table 53. An abrasive may be suspended in the processing liquid in the processing tank 51.

The nozzle 10 is disposed in the nozzle pipe 57. The nozzle pipe 57 includes a nozzle chamber 57a, an external thread 57b, a fluid passage 57c, and a packing groove 57d. The nozzle chamber 57a, which has a right cylindrical shape, opens to the distal end of the nozzle pipe 57. The nozzle chamber 57a is connected to the fluid passage 57c.

The nozzle 10 is disposed in the nozzle chamber 57a. The nozzle chamber 57a, the external thread 57b, the fluid passage 57c and the packing groove 57d are arranged coaxially with the ejection axis 1. The packing groove 57d is located on a bottom surface of the nozzle chamber 57a. The nozzle 10 abuts against the nozzle chamber 57a. The packing 58 is, for example, an O-ring. The packing 58 is disposed in the packing groove 57d to seal a gap between the nozzle pipe 57 and the nozzle 10. The cap 59 includes an internal thread 59a and a jet passage 59b. The jet passage 59b is connected to the jet passage hole 15d.

The high-pressure pump 56 is, for example, a plunger pump. The high-pressure pump 56 is connected to the fluid passage 57c. The moving device 55 is connected to the nozzle pipe 57. The moving device 55 can move the nozzle pipe 57 in the left-right, up-down, and front-rear directions.

Figure 7:
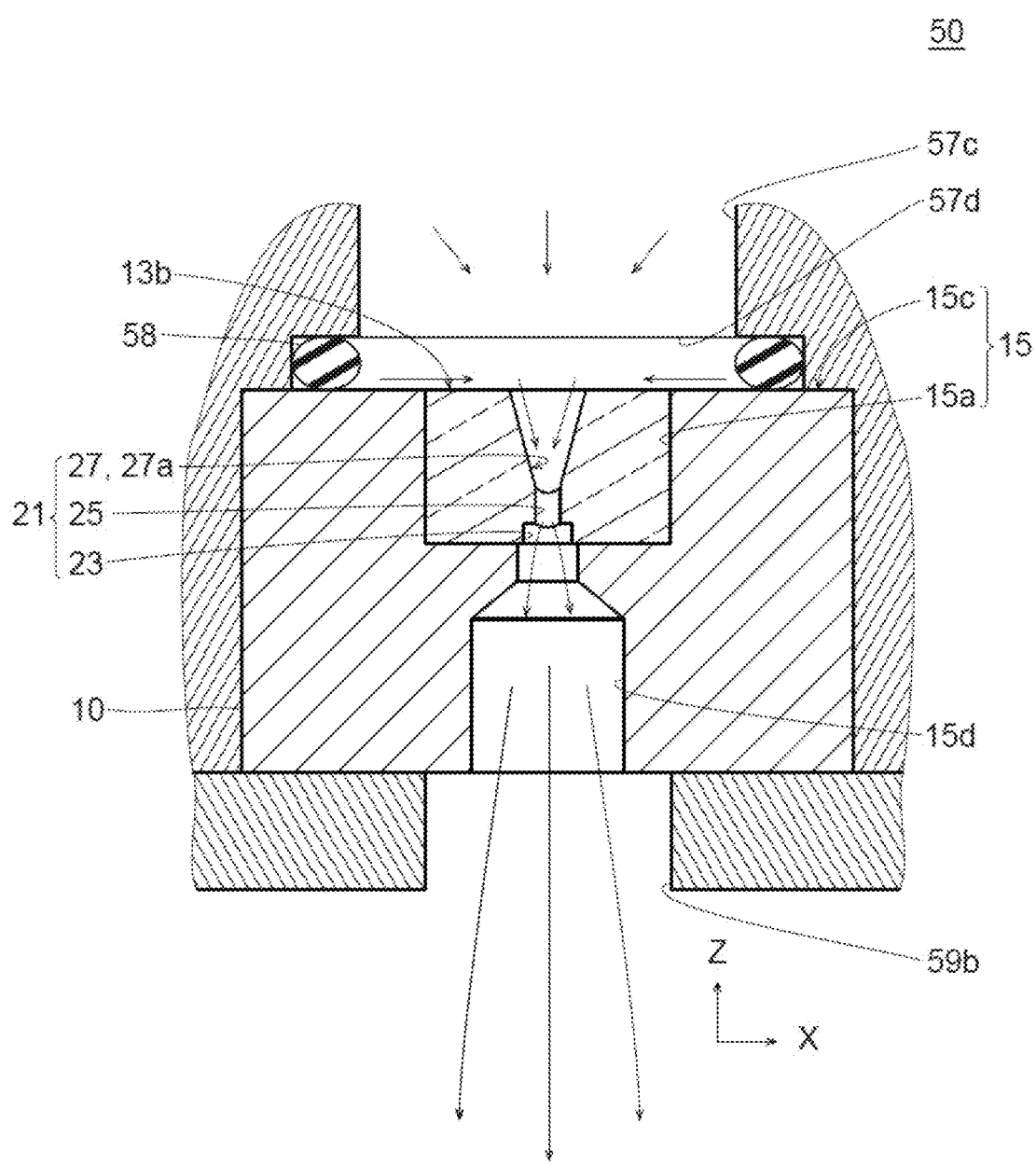
FIG. 7 is an enlarged view of the cavitation surface processing apparatus according to the present embodiment.

As shown in FIG. 7, according to the nozzle 10 of the present embodiment, the processing water, which is supplied from the high-pressure pump 56, flows from the introduction portion 27 into the ejection hole 25, is rectified and accelerated. As the first bottom surface 15c and the second plane 13b are substantially the same, the processing liquid smoothly flows into the introduction portion 27. The processing liquid is ejected from the ejection hole 25 having an elliptic columnar shape through the discharge groove 23. The rectified processing water is strongly ejected from the ejection hole 25, and spreads in a flat plate shape on XZ plane by the discharge groove 23. As the ejection hole 25 has an elliptic columnar shape, the ejected processing liquid easily diffuses in the X direction. The ejection angle is preferably 5 to 15 degrees. More preferably, the ejection angle is 7 to 10 degrees. The processing liquid is thus vigorously diffused on XZ plane in the processing liquid stored in the processing tank 51, and the generation of the cavity is promoted. The processing liquid containing a large amount of cavities then collides with the workpiece 3. This promotes the application of compressive stress to the surface of the workpiece 3.

The nozzle hole 21 and the second plane 13b in which the nozzle hole 21 is arranged are diamond sintered bodies. This enables to reduce the amount of wear when the processing liquid flows at high speed.

The cap 59 is detachably attached to the nozzle pipe 57. Thus, when the cap 59 is worn out, it is easily replaced. As the hardness of the nozzle tip 13 is high, the nozzle tip 13 is less likely to be worn out. Further, as the support 15 is made of corrosion-resistant steel or high-tensile strength steel, it is excellent in durability.

When the abrasive particles are turbid in the processing tank 51, the surface of the workpiece 3 is ground by the abrasive particles. As the flow velocity of the processing water ejected from the nozzle 10 is high, the abrasive particles are accelerated and collide with the surface of the workpiece 3. This promotes grinding of the surface of the workpiece 3.

When the abrasive particles are turbid, wear of the nozzle 10 is promoted. However, the nozzle hole 21 and the first plane 13a in which the nozzle hole 21 is arranged are diamond sintered bodies. This suppresses wear of the nozzle hole 21 and the first plane 13a.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

1 Ejection axis
10 Cavitation surface processing nozzle
11 Nozzle body
13 Nozzle tip
13a First plane
13b Second plane
15 Support
21 Nozzle hole
23 Discharge groove
25 Ejection hole
27 Introduction portion

What is claimed is:

1. A cavitation surface processing nozzle, comprising:
a nozzle tip including
   a first plane from which liquid is ejected, the first plane perpendicular to an ejection axis;
   a second plane perpendicular to the ejection axis, the second plane being another side plane of the first plane; and
a nozzle hole including
   a discharge groove located in the first plane, the discharge groove having a semi-cylindrical shape extending in a first direction perpendicular to the ejection axis, the discharge groove including planar lateral surfaces at both ends,
   an ejection hole extending along the ejection axis to be connected to the discharge groove, the ejection hole having a right elliptic cylindrical shape having an elliptic cross section with a long diameter extending in the first direction, and
   an introduction portion having a right conical surface centered on the ejection axis, the introduction portion connected to the ejection hole.

2. The cavitation surface processing nozzle according to claim 1, wherein
the nozzle tip has a columnar shape with the first plane and the second plane at both ends.

3. The cavitation surface processing nozzle according to claim 2, further comprising:
a support having a right cylindrical shape, the support including
   a first bottom surface substantially the same plane as the second plane,
   a nozzle tip chamber located on the first bottom surface, the nozzle tip chamber receiving the nozzle tip to abut the nozzle tip,
   a second bottom surface being another side surface of the first bottom surface, and
   a jet passage hole extending from the second bottom surface along the ejection axis to be connected to the nozzle tip chamber.

4. The cavitation surface processing nozzle according to claim 2, wherein
the nozzle tip has a Mohs hardness of 9 or greater.

5. The cavitation surface processing nozzle according to claim 1, wherein
the nozzle tip has a Mohs hardness of 9 or greater.

6. The cavitation surface processing nozzle according to claim 5, further comprising,
a support having a right cylindrical shape, the support including
   a first bottom surface substantially the same plane as the second plane,
   a nozzle tip chamber located on the first bottom surface, the nozzle tip chamber receiving the nozzle tip to abut the nozzle tip,
   a second bottom surface being another side surface of the first bottom surface, and
   a jet passage hole extending from the second bottom surface along the ejection axis to be connected to the nozzle tip chamber, wherein
the support is made of corrosion-resistant alloy or high-tensile strength steel.

7. The cavitation surface processing nozzle according to claim 5, further comprising
a support having a right cylindrical shape, the support including
   a first bottom surface substantially the same plane as the second plane,
   a nozzle tip chamber located on the first bottom surface, the nozzle tip chamber receiving the nozzle tip to abut the nozzle tip,
   a second bottom surface being another side surface of the first bottom surface, and
   a jet passage hole extending from the second bottom surface along the ejection axis to be connected to the nozzle tip chamber, wherein
the support is a separate member from the nozzle tip.

8. The cavitation surface processing nozzle according to claim 1, wherein
the right conical surface has a smaller diameter toward the first plane.

9. A cavitation surface processing apparatus, comprising:
a processing tank storing processing liquid;
a table disposed in the processing tank, the table on which a workpiece is installed;
the cavitation surface processing nozzle according to claim 1; and
a nozzle pipe to which the cavitation surface processing nozzle is attachable, the nozzle pipe movable in a front-rear direction, a vertical direction, and a lateral direction with respect to the table.

10. The cavitation surface processing apparatus according to claim 9, wherein
the nozzle pipe includes a nozzle chamber to which the cavitation surface processing nozzle is abut and inserted, and
the cavitation surface processing apparatus further comprises
a nozzle cap disposed at a distal end of the nozzle pipe for fixing the cavitation surface processing nozzle to the nozzle pipe.

11. The cavitation surface processing nozzle according to claim 1, wherein
the discharge groove has a length shorter than a diameter of the nozzle tip.

12. A cavitation surface processing nozzle comprising:
a nozzle tip including
   a first plane from which liquid is ejected, the first plane perpendicular to an ejection axis;
   a second plane perpendicular to the ejection axis, the second plane being another side plane of the first plane;
a nozzle hole including
   a discharge groove located in the first plane, the discharge groove having a semi-cylindrical shape extending in a first direction perpendicular to the ejection axis, an ejection hole extending along the ejection axis to be connected to the discharge groove, the ejection hole having a right elliptic cylindrical shape having an elliptic cross section with a long diameter extending in the first direction, and an introduction portion having a right conical surface centered on the ejection axis, the introduction portion connected to the ejection hole; and a support having a right cylindrical shape, the support including a first bottom surface on substantially the same plane as the second plane, a nozzle tip chamber located in the first bottom surface, the nozzle tip chamber receiving the nozzle tip to abut the nozzle tip, a second bottom surface being another side surface of the first bottom surface, and a jet passage hole extending from the second bottom surface along the ejection axis to be connected to the nozzle tip chamber.

13. The cavitation surface processing nozzle according to claim 12, wherein the support is made of corrosion-resistant alloy or high-tensile strength steel.

14. The cavitation surface processing nozzle according to claim 12, wherein the support is a separate member from the nozzle tip.

15. The cavitation surface processing nozzle according to claim 12, wherein the support is integral with the nozzle tip.

16. The cavitation surface processing nozzle according to claim 12, wherein the discharge groove has an opening, the jet passage hole has a smaller cross section toward the nozzle tip chamber, and the opening is located inside a cross section of the jet passage hole at a connecting portion to the nozzle tip chamber.

17. The cavitation surface processing nozzle according to claim 12, wherein the nozzle tip has a Mohs hardness of 9 or greater.

* * * * *